(12) United States Patent
Takata et al.

(10) Patent No.: US 11,319,873 B2
(45) Date of Patent: May 3, 2022

(54) TURBO CLUSTER GAS TURBINE SYSTEM AND ACTIVATION METHOD THEREOF

(71) Applicant: MITSUBISHI HEAVY INDUSTRIES, LTD., Tokyo (JP)

(72) Inventors: Ryo Takata, Tokyo (JP); Takao Yokoyama, Tokyo (JP); Kenji Nakamichi, Tokyo (JP); Shinsuke Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/780,261

(22) Filed: Feb. 3, 2020

(65) Prior Publication Data

US 2020/0355118 A1 Nov. 12, 2020

(30) Foreign Application Priority Data

May 9, 2019 (JP) .............................. JP2019-088776

(51) Int. Cl.
*F02C 6/02* (2006.01)
*F02C 3/06* (2006.01)
*F01D 13/00* (2006.01)

(52) U.S. Cl.
CPC .............. *F02C 6/02* (2013.01); *F01D 13/003* (2013.01); *F02C 3/06* (2013.01)

(58) Field of Classification Search
CPC .... F02C 6/02; F02C 6/04; F01D 13/02; F01D 13/003
See application file for complete search history.

(56) References Cited

U.S. PATENT DOCUMENTS

| | | | | | |
|---|---|---|---|---|---|
| 2,418,911 | A | * | 4/1947 | Smith | ..................... F02C 3/055 60/39.17 |
| 2,469,238 | A | * | 5/1949 | Newton | .................... F02C 7/36 60/792 |
| 2,675,673 | A | * | 4/1954 | Mallinson | ................. F02C 3/36 60/792 |

(Continued)

FOREIGN PATENT DOCUMENTS

| | | |
|---|---|---|
| EP | 2 886 442 | 6/2015 |
| JP | 55109726 A * | 8/1980 ............ F02B 37/004 |

(Continued)

*Primary Examiner* — Todd E Manahan
*Assistant Examiner* — Marc J Amar
(74) *Attorney, Agent, or Firm* — Wenderoth, Lind & Ponack, L.L.P.

(57) ABSTRACT

A turbo cluster gas turbine system includes: at least one combustor configured to combust a fuel to generate a combustion gas; an output turbine configured to be driven with the combustion gas from the at least one combustor; and a plurality of supercharging systems configured to supply compressed air to be supplied to the at least one combustor, wherein each of the supercharging systems includes: a first turbocharger having a rotation shaft formed separately from a rotation shaft of the output turbine and configured to be driven with the combustion gas from the combustor; a first air line for supplying compressed air compressed by a compressor of the first turbocharger to the combustor; and a first combustion gas line for supplying the combustion gas from the combustor to a turbine of the first turbocharger.

12 Claims, 10 Drawing Sheets

(56) References Cited

U.S. PATENT DOCUMENTS

| | | | | |
|---|---|---|---|---|
| 3,166,902 A * | 1/1965 | Meyer | | F02C 9/16 60/792 |
| 5,119,624 A * | 6/1992 | McKenna | | F02C 6/20 60/39.511 |
| 5,943,859 A * | 8/1999 | Kawamura | | F02B 43/10 60/320 |
| 5,992,139 A * | 11/1999 | Kesseli | | F02C 7/143 60/39.183 |
| 6,112,523 A * | 9/2000 | Kamo | | F02B 37/16 60/612 |
| 6,615,586 B1 * | 9/2003 | Boric | | B63H 21/20 60/729 |
| 6,860,109 B2 * | 3/2005 | Tsuji | | F02C 7/18 415/115 |
| 7,036,313 B1 * | 5/2006 | Weaver | | F01K 23/10 60/599 |
| 7,168,235 B2 * | 1/2007 | Kopko | | F02C 3/36 60/39.45 |
| 9,447,754 B1 * | 9/2016 | Clarke | | F02B 75/02 |
| 2006/0225432 A1 * | 10/2006 | Awdalla | | F02C 3/04 60/792 |
| 2008/0169246 A1 * | 7/2008 | Japikse | | F02C 6/10 210/741 |
| 2011/0252795 A1 * | 10/2011 | Heyes | | F02B 37/001 60/611 |
| 2013/0074516 A1 * | 3/2013 | Heward | | F02C 7/32 290/1 A |
| 2014/0306460 A1 * | 10/2014 | Donnelly | | F02C 7/32 290/1 A |
| 2014/0366547 A1 * | 12/2014 | Kraft | | F02C 7/10 60/772 |
| 2015/0027115 A1 * | 1/2015 | Watanabe | | F02B 37/18 60/600 |
| 2016/0153684 A1 * | 6/2016 | Lemieux | | B60H 1/3204 62/87 |
| 2018/0058242 A1 * | 3/2018 | Malkamaki | | F02C 6/003 |
| 2018/0058352 A1 * | 3/2018 | Clarke | | F02D 41/08 |
| 2019/0195131 A1 * | 6/2019 | Zia | | F02B 37/007 |
| 2020/0191048 A1 * | 6/2020 | Homison | | F02B 37/10 |
| 2020/0191051 A1 * | 6/2020 | Homison | | F02C 7/141 |
| 2020/0271066 A1 * | 8/2020 | zur Loye | | F02N 9/04 |

FOREIGN PATENT DOCUMENTS

| | | | | |
|---|---|---|---|---|
| JP | 55109727 A * | 8/1980 | | F02B 37/007 |
| JP | 2000-073782 | 3/2000 | | |
| JP | 5571151 | 8/2014 | | |
| JP | 6031097 | 11/2016 | | |
| WO | 2012/173651 | 12/2012 | | |

* cited by examiner

TURBO CLUSTER GAS TURBINE SYSTEM AND ACTIVATION METHOD THEREOF

TECHNICAL FIELD

The present disclosure relates to a turbo cluster gas turbine system and an activation method thereof.

BACKGROUND

For example, as described in Patent Document 1, a conventional gas turbine is configured such that a compressor and an output turbine rotate integrally on the same axis.

CITATION LIST

Patent Literature

Patent Document 1: JP2000-73782A

SUMMARY

However, when a gas turbine is configured such that a compressor and an output turbine rotate integrally on the same axis, the gas turbine becomes large in an axial direction, which is likely to cause restrictions on the layout of the gas turbine.

With the foregoing in view, an object of at least one embodiment of the present invention is to provide a turbo cluster gas turbine system having a high degree of freedom in layout and an activation method thereof.

(1) A turbo cluster gas turbine system according to at least one embodiment of the present invention includes: at least one combustor configured to combust a fuel to generate a combustion gas; an output turbine configured to be driven with the combustion gas from the at least one combustor; and a plurality of supercharging systems configured to supply compressed air to be supplied to the at least one combustor, wherein each of the supercharging systems includes: a first turbocharger having a rotation shaft formed separately from a rotation shaft of the output turbine and configured to be driven with the combustion gas from the combustor; a first air line for supplying compressed air compressed by a compressor of the first turbocharger to the combustor; and a first combustion gas line for supplying the combustion gas from the combustor to a turbine of the first turbocharger.

According to the turbo cluster gas turbine system according to (1), since the rotation shaft of the first turbocharger is formed separately from the rotation shaft of the output turbine, a plurality of first turbochargers can be arranged on an axis different from the axis of the output turbine, and a turbo cluster gas turbine system having a high degree of freedom in layout can be realized. Moreover, it is possible to obtain a desired output of an output turbine using a plurality of first turbochargers while decreasing the sizes of devices configured integrally with an output turbine including the output turbine in the axial direction of the output turbine as compared to a conventional gas turbine configured such that a compressor and an output turbine rotate integrally on one axis. Moreover, by adjusting the number of first turbochargers to be driven among the plurality of first turbochargers, it is possible to realize flexible partial load operation. Moreover, even when some supercharging system among the plurality of supercharging systems could not be used temporarily due to certain reasons, since operation of the output turbine can be maintained by the other supercharging systems, high reliability in the perspective of operation stability can be realized. Moreover, satisfactory maintenance properties can be realized using compact turbochargers as the plurality of first turbochargers.

(2) In some embodiments, in the turbo cluster gas turbine system according to (1), each of the supercharging systems includes: at least one second turbocharger having a rotation shaft formed separately from the rotation shaft of the output turbine and the rotation shaft of the first turbocharger; a second air line for supplying compressed air compressed by a compressor of the second turbocharger to the compressor of the first turbocharger; and a second combustion gas line for supplying the combustion gas exhausted from a turbine of the first turbocharger to a turbine of the second turbocharger.

According to the turbo cluster gas turbine system according to (2), since the rotation shaft of the first turbocharger is formed separately from the rotation shaft of the output turbine, a plurality of first turbochargers, a plurality of second turbochargers, and the output turbine can be arranged on separate axes, and a turbo cluster gas turbine system having a high degree of freedom in layout can be realized. By supplying high-pressure air compressed by the first and second turbochargers to the combustor, it is possible to obtain high combustion energy and realize a high output of the output turbine.

(3) In some embodiments, in the turbo cluster gas turbine system according to (2), the turbo cluster gas turbine system includes a plurality of the combustors, and the plurality of supercharging systems are configured to supply compressed air to the plurality of combustors, respectively.

According to the turbo cluster gas turbine system according to (3), the compressed air is supplied from the compressor of one first turbocharger to one combustor (one heat chamber) through the first air line. Therefore, since the first air line of each supercharging system can be connected to the corresponding combustor without joining the same to the first air line of another supercharging system, it is possible to decrease pressure loss with the aid of smooth supercharging to realize high-efficiency combustion. By adjusting the number of first turbochargers to be driven among the plurality of first turbochargers, it is possible to realize flexible partial load operation.

(4) In some embodiments, in the turbo cluster gas turbine system according to (2) or (3), the output turbine is provided in the first combustion gas line.

According to the turbo cluster gas turbine system according to (4), the combustion gas which has passed through the output turbine and of which the temperature has decreased can be supplied to the first turbocharger. Therefore, even when the temperature of the combustion gas at the outlet of the combustor is set to approximately 1300° C. which is a temperature of the same level as the temperature of the combustion gas at the outlet of the combustor of a conventional gas turbine for ships, the temperature of the combustion gas at the inlet of the turbine of the first turbocharger decreases up to approximately 960° C. Therefore, from the perspective of heat resistance, a turbocharger (a turbocharger which can be manufactured at a low cost by line production) designed for gasoline engines for automobiles in which nickel-base alloys or the like are used in materials of components can be used as the first turbocharger, and the cost reduction of the turbo cluster gas turbine system can be realized.

(5) In some embodiments, in the turbo cluster gas turbine system according to (2) or (3), each of the supercharging systems includes a third combustion gas line for supplying the combustion gas having passed through the turbine of the second turbocharger to the output turbine.

According to the turbo cluster gas turbine system according to (5), by adjusting the temperature of the combustion gas at the outlet of the combustor appropriately, a turbocharger (a turbocharger which can be manufactured at a low cost by line production) designed for gasoline engines for automobiles in which nickel-base alloys or the like are used in materials of components can be used as the first turbocharger, and the cost reduction of the turbo cluster gas turbine system can be realized.

(6) In some embodiments, in the turbo cluster gas turbine system according to any one of (2) to (5), each of the supercharging systems includes an intercooler provided in the second air line.

According to the turbo cluster gas turbine system according to (6), it is possible to increase the density of the compressed air to be supplied to the combustor to enhance the combustion efficiency of the combustor.

(7) In some embodiments, in the turbo cluster gas turbine system according to any one of (2) to (6), a sum of the number of the first turbochargers and the number of the second turbochargers is 10 or more.

According to the turbo cluster gas turbine system according to (7), it is possible to obtain a desired output of the output turbine using ten or more first turbochargers. Moreover, by adjusting the number of first turbochargers to be driven among the ten or more first turbochargers, it is possible to realize flexible partial load operation.

(8) In some embodiments, the turbo cluster gas turbine system according to any one of (2) to (7) further includes: a heat exchanger for performing heat exchange between the compressed air flowing through the first air line and the combustion gas exhausted from the turbine of the second turbocharger.

According to the turbo cluster gas turbine system according to (8), it is possible to collect the exhaust heat of the second turbocharger using the heat exchanger and enhance overall system efficiency.

(9) In some embodiments, the turbo cluster gas turbine system according to any one of (2) to (7) further includes: a heat exchanger for performing heat exchange between a heating medium and the combustion gas exhausted from the turbine of the second turbocharger; and a turbine configured to be driven with the heating medium exhausted from the heat exchanger.

According to the turbo cluster gas turbine system according to (9), it is possible to collect the exhaust heat of the second turbocharger using the heat exchanger and the turbine and enhance overall system efficiency.

(10) In some embodiments, the turbo cluster gas turbine system according to any one of (1) to (9) further includes: a reciprocating engine; an activation line connecting an outlet of the reciprocating engine and the first combustion gas line; a first valve provided, in the first combustion gas line, upstream of a connection position between the first combustion gas line and the activation line; and a second valve provided in the activation line.

According to the turbo cluster gas turbine system according to (10), when the system is activated, the compressed air exhausted from the reciprocating engine is supplied to the turbine of the first turbocharger through the activation line and the first combustion gas line to start rotation of the first turbocharger in a state in which the first valve is closed and the second valve is open. The compressed air having passed through the turbine of the first turbocharger is supplied to the turbine of the second turbocharger and the second turbocharger starts rotating. In this way, the air compressed by the compressor of the second turbocharger is compressed further by the compressor of the first turbocharger, the compressed air exhausted from the compressor is supplied to the combustor through the first air line, and the combustor ignites the fuel using the supplied compressed air.

In this way, since quick ignition in the combustor is realized with a simple configuration, and the output turbine is driven with the combustion gas generated by the combustor, it is possible to quickly activate the turbo cluster gas turbine system.

(11) In some embodiments, in the turbo cluster gas turbine system according to any one of (1) to (10), the first turbocharger is configured to meet heat resistance against the combustion gas.

According to the turbo cluster gas turbine system according to (11), it is possible to suppress damage of the first turbocharger due to the heat of the combustion gas even if a cooling mechanism is not provided in the first turbocharger.

(12) In some embodiments, in the turbo cluster gas turbine system according to any one of (1) to (11), the first turbocharger is a turbocharger designed for automobile gasoline engines.

According to the turbo cluster gas turbine system according to (12), it is possible to realize cost reduction of the turbo cluster gas turbine system.

(13) A turbo cluster gas turbine system activation method according to at least one embodiment of the present invention includes: supplying compressed air exhausted from a reciprocating engine to a turbine of a first turbocharger to allow the first turbocharger to start rotating; supplying compressed air exhausted from a compressor of the first turbocharger having started rotating to a combustor; igniting a fuel using the compressed air supplied to the combustor; and supplying a combustion gas exhausted from the combustor to an output turbine to allow the output turbine to start rotating.

According to the turbo cluster gas turbine system activation method according to (13), it is possible to realize quick ignition in the combustor with a simple configuration using a reciprocating engine and quickly activate the output turbine with the combustion gas generated by the combustor.

(14) In some embodiments, the turbo cluster gas turbine system activation method according to (13) further includes: supplying compressed air having passed through the turbine of the first turbocharger to a turbine of a second turbocharger to allow the second turbocharger to start rotating; and supplying compressed air exhausted from a compressor of the second turbocharger having starting rotating to the compressor of the first turbocharger.

According to the turbo cluster gas turbine system activation method according to (13), it is possible to realize quick ignition in the combustor with a simple configuration using a reciprocating engine and quickly activate the output turbine with the combustion gas generated by the combustor.

According to at least one embodiment of the present invention, a turbo cluster gas turbine system having a high degree of freedom in layout and an activation method thereof are provided.

DETAILED DESCRIPTION

Figure 1:
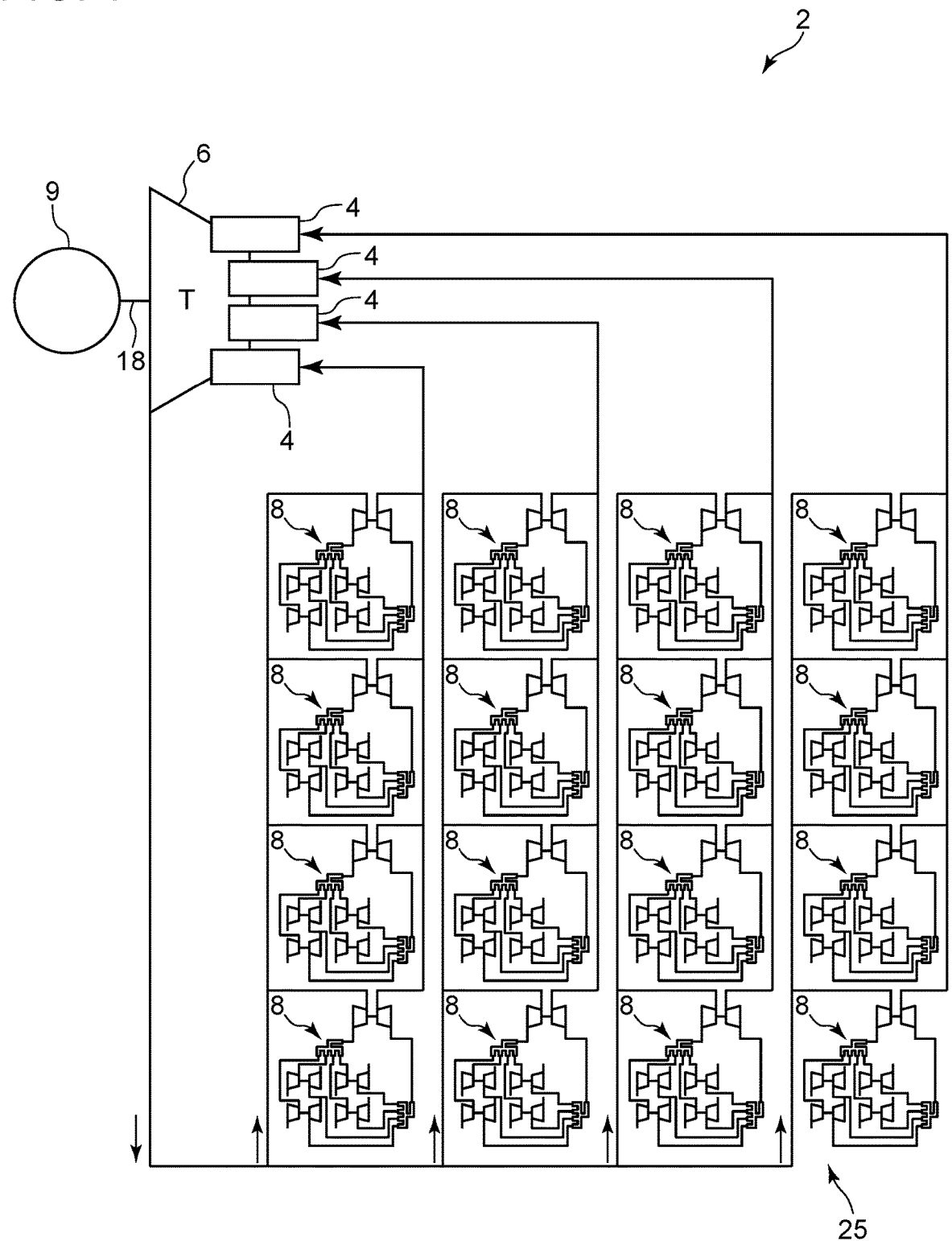
FIG. 1 is a schematic diagram illustrating an entire configuration of a turbo cluster gas turbine system 2 according to an embodiment.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same" "equal" and "uniform" shall not be construed as indicating only the state in which the feature is strictly equal, but also includes a state in which there is a tolerance or a difference that can still achieve the same function.

Furthermore, in the present specification, an expression of a shape such as a rectangular shape or a cylindrical shape shall not be construed as only the geometrically strict shape, but also includes a shape with unevenness or chamfered corners within the range in which the same effect can be achieved.

Furthermore, in the present specification, an expression such as "comprise," "include," "have," "contain" and "constitute" are not intended to be exclusive of other components.

Moreover, in some embodiments to be described later, the same reference numerals indicate components having similar configurations unless particularly stated and redundant description will be omitted.

FIG. 1 is a schematic diagram illustrating an entire configuration of a turbo cluster gas turbine system 2 according to an embodiment.

As illustrated in FIG. 1, the turbo cluster gas turbine system 2 includes a plurality of combustors 4 configured to combust a fuel to generate a combustion gas, an output turbine 6 configured to be driven with a combustion gas exhausted from the plurality of combustors 4, and a plurality of supercharging systems 8 configured to supply a compressed air to the plurality of combustors 4. A generator 9 is connected to the output turbine 6, and the generator 9 generates electric power when the output turbine 6 rotates. Although the output of the output turbine 6 is not particularly limited, the output may be 10 MW or more, for example. It is noted that in an exemplary embodiment illustrated in FIG. 1, the turbo cluster gas turbine system 2 includes sixteen supercharging systems 8.

Figure 2:
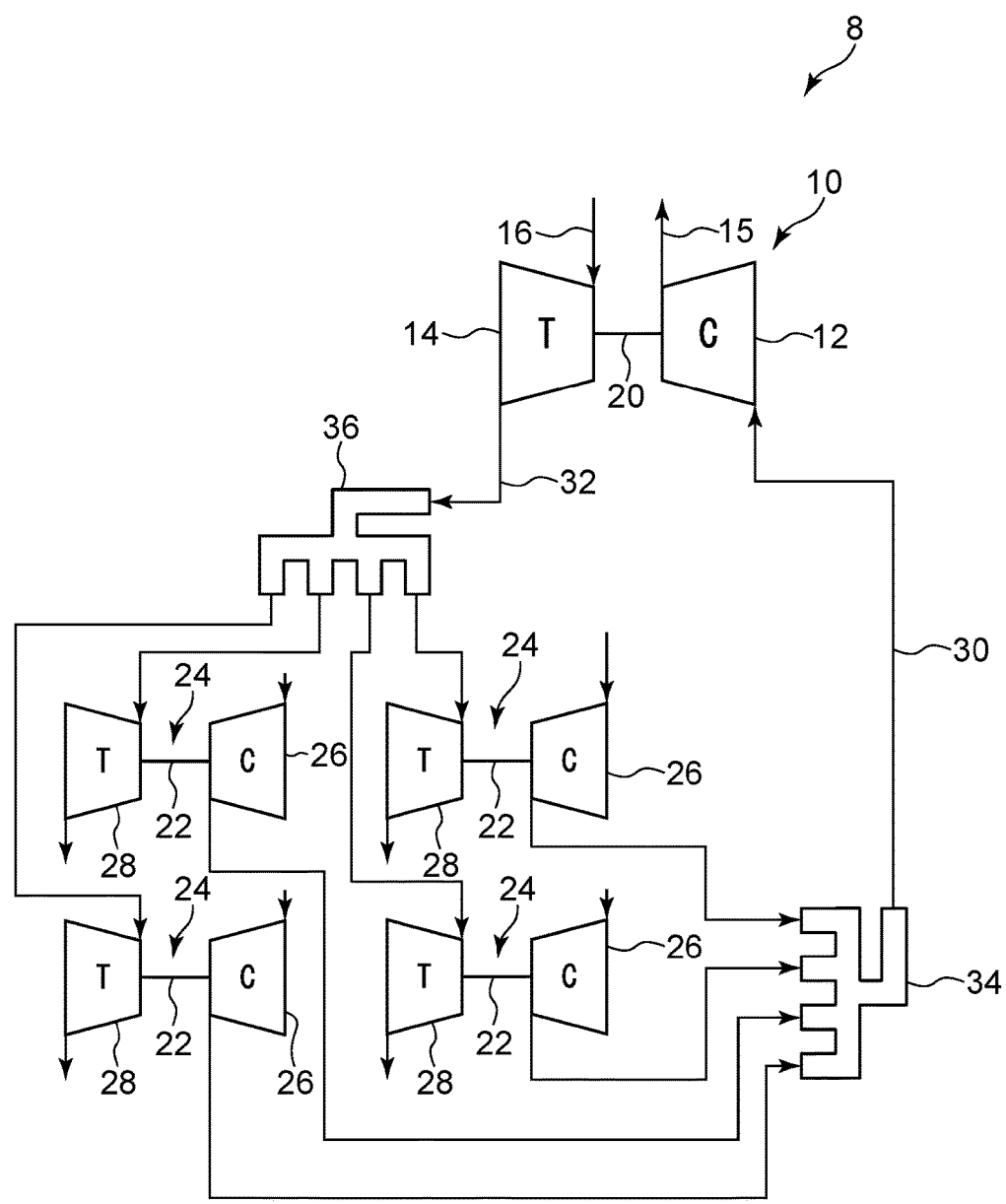
FIG. 2 is a diagram illustrating an overall configuration of each supercharging system 8.

FIG. 2 is a diagram illustrating a schematic configuration of each of the supercharging systems 8.

As illustrated in FIG. 2, each of the supercharging systems 8 includes a first turbocharger 10, a first air line 15, a first combustion gas line 16, a plurality of second turbochargers 24, a second air line 30, a second combustion gas line 32, a first manifold 34, and a second manifold 36. Herein, the "air line" means an air pipe line, and the "gas line" means a gas pipe line.

The first turbocharger 10 includes a compressor 12 and a turbine 14 that share a rotation shaft 20 and is configured to be driven with the combustion gas exhausted from the combustor 4 (see FIG. 1). The rotation shaft 20 of the first turbocharger 10 is formed separately from a rotation shaft 18 (see FIG. 1) of the output turbine 6 (see FIG. 1) and is disposed on an axial line different from that of the rotation shaft 18. When a compact turbocharger manufactured by line production and designed for gasoline engines for automobiles, for example, is used as the first turbocharger 10, it is possible to realize the turbo cluster gas turbine system 2 at an extremely low cost as compared to a conventional gas turbine.

The first air line 15 is configured to supply compressed air compressed by the compressor 12 of the first turbocharger 10 to the combustor 4.

The first combustion gas line 16 is configured to supply the combustion gas exhausted from the combustor 4 to the turbine 14 of the first turbocharger 10.

Each of the second turbocharger 24 includes a compressor 26 and a turbine 28 that share a rotation shaft 22 and is configured to be driven with the combustion gas exhausted from the combustor 4. Moreover, the rotation shaft 22 of the second turbocharger 24 is formed separately from the rotation shaft 18 of the output turbine 6 and the rotation shaft 20 of the first turbocharger 10 and is disposed on an axial line different from those of the rotation shafts 18 and 20. When a compact turbocharger manufactured by line production and designed for gasoline engines for automobiles, for example, is used as the second turbocharger 24, it is possible to realize the turbo cluster gas turbine system 2 which is very inexpensive as compared to a conventional gas turbine.

It is noted that in the illustrated exemplary embodiment, four second turbochargers 24 are arranged in parallel in a flowing direction of the combustion gas. Therefore, in the exemplary embodiment illustrated in FIGS. 1 and 2, the turbo cluster gas turbine system 2 includes sixteen first turbocharger 10 and sixty four second turbochargers 24 for one output turbine 6, and includes a cluster 25 (a turbo cluster) composed of eighty turbochargers in total.

The second air line 30 is configured to supply the compressed air compressed by the compressor 26 of each of the second turbochargers 24 to the compressor 12 of the first turbocharger 10. A downstream end of the second air line 30 is connected to an inlet of the compressor 12 of the first turbocharger 10, an upstream end of the second air line 30 branches into a plurality of points via the first manifold 34 and is connected to the outlet of the compressor 26 of each of the second turbochargers 24.

The second combustion gas line 32 is configured to supply the combustion gas exhausted from the turbine 14 of the first turbocharger 10 to the turbine 28 of each of the second turbochargers 24. An upstream end of the second combustion gas line 32 is connected to the outlet of the turbine 14 of the first turbocharger 10, and a downstream end of the second combustion gas line 32 branches into a plurality of points via the second manifold 36 and is connected to the inlet of the turbine 28 of each of the second turbochargers 24.

According to this configuration, since the rotation shaft 20 of the first turbocharger 10 is formed separately from the rotation shaft 18 of the output turbine 6, the plurality of first turbochargers 10 can be arranged on an axis different from that of the output turbine 6, and the turbo cluster gas turbine system 2 having a high degree of freedom in layout can be realized.

Moreover, it is possible to obtain a desired output of the output turbine 6 using the plurality of first turbochargers 10 while decreasing the sizes of devices (in the configuration illustrated in FIG. 1, a device in which the combustor 4, the output turbine 6, and the generator 9 are integrated) configured integrally with the output turbine 6 including the output turbine 6 in the axial direction of the output turbine 6 as compared to a conventional gas turbine configured such that a compressor and an output turbine rotate integrally on one axis.

Moreover, by adjusting the number of first turbochargers 10 to be driven among the plurality of first turbochargers 10, it is possible to realize flexible partial load operation. Moreover, even when some supercharging system 8 among the plurality of supercharging systems 8 could not be used temporarily due to certain reasons, since operation of the output turbine 6 can be maintained by the other supercharging systems 8, high reliability in the perspective of operation stability can be realized. Moreover, satisfactory maintenance properties can be realized using compact turbochargers as the plurality of first and second turbochargers 10 and 24.

Figure 3:
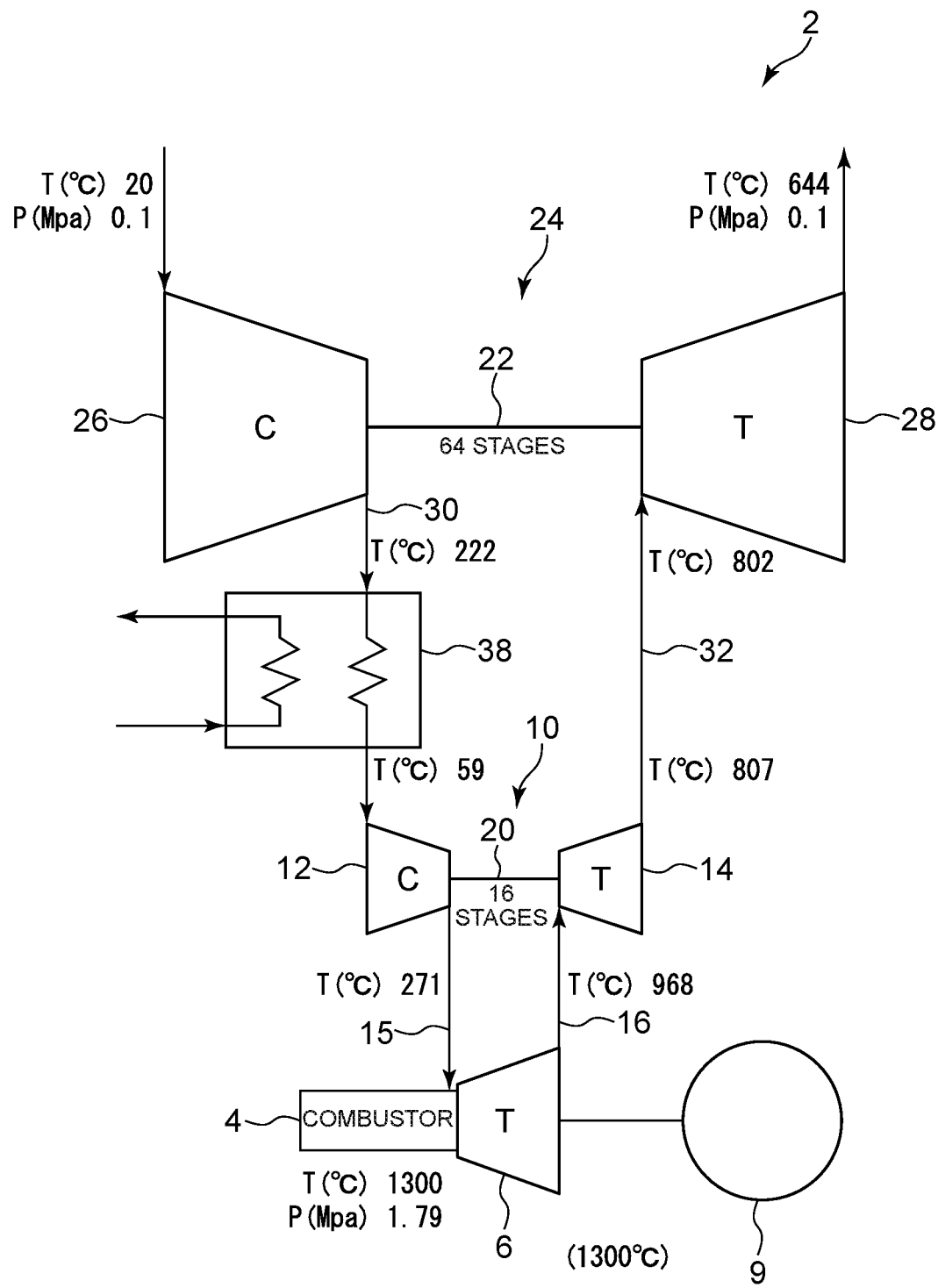
FIG. 3 is a diagram illustrating a cycle evaluation of the turbo cluster gas turbine system 2 illustrated in FIGS. 1 and 2 when the temperature of a combustion gas at the inlet of an output turbine 6 was set to 1300° C.

FIG. 3 is a diagram illustrating a cycle evaluation for the turbo cluster gas turbine system 2 illustrated in FIGS. 1 and 2 when the temperature of the combustion gas at the inlet of the output turbine 6 was set to 1300° C.

In the example illustrated in FIG. 3, an intercooler 38 is provided in the second air line 30, and the compressed air flowing through the second air line 30 is cooled by heat exchange between the intercooler 38 and a cooling medium. In the example illustrated in FIG. 3, the temperature and the pressure of the air at the inlet of the compressor 26 are 20° C. and 0.1 MPa, the temperature of the compressed air at the inlet of the intercooler 38 is 222° C., the temperature of the compressed air at the inlet of the compressor 12 is 59° C., and the temperature of the compressed air at the inlet of the combustor 4 is 271° C. Moreover, the temperature and the pressure of the combustion gas at the outlet of the combustor 4 (the temperature and the pressure of the combustion gas at the inlet of the output turbine 6) are 1300° C. and 1.79 MPa, the temperature of the combustion gas at the inlet of the turbine 14 is 968° C., the temperature of the combustion gas at the inlet of the turbine 28 is 802° C., and the temperature and the pressure of the combustion gas at the outlet of the turbine 28 are 644° C. and 0.1 MPa.

In the configuration illustrated in FIG. 3, since the output turbine 6 is provided in the first combustion gas line 16, the combustion gas which has passed through the output turbine 6 and of which the temperature has decreased can be supplied to the first turbocharger 10. Therefore, even when the temperature of the combustion gas at the outlet of the combustor 4 is set to approximately 1300° C. which is a temperature of the same level as the temperature of the combustion gas at the outlet of the combustor of a conventional gas turbine for ships, the temperature of the combustion gas at the inlet of the turbine 14 of the first turbocharger 10 decreases up to approximately 960° C. Therefore, from the perspective of heat resistance, a turbocharger (a turbocharger which can be manufactured at a low cost by line production) designed for gasoline engines for automobiles in which nickel-base alloys or the like are used in materials of components can be used as the first turbocharger 10, and the cost reduction of the turbo cluster gas turbine system 2 can be realized.

Figure 4:
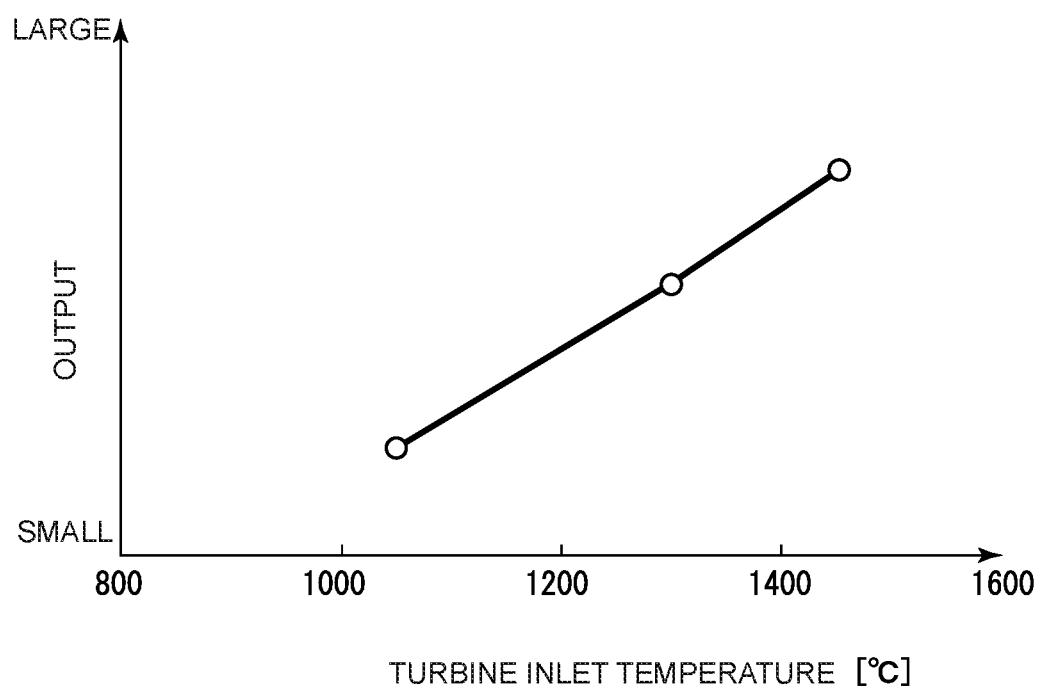
FIG. 4 is a diagram illustrating a relationship between the temperature (turbine inlet temperature) of a combustion gas at the inlet of the output turbine 6 and an output of a generator 9 connected to the output turbine in the configuration illustrated in FIG. 3 and illustrates cases where the turbine inlet temperature was set to 1050° C., 1300° C., and 1450° C.

FIG. 4 is a diagram illustrating a relationship between the temperature (turbine inlet temperature) of a combustion gas at the inlet of the output turbine 6 and an output of the generator 9 connected to the output turbine in the configuration illustrated in FIG. 3 and illustrates cases where the turbine inlet temperature was set to 1050° C., 1300° C., and 1450° C. In the example illustrated in FIGS. 3 and 4, a cooling mechanism is not provided in the first and second turbochargers 10 and 24.

As illustrated in FIG. 4, the output of the generator increases as the turbine inlet temperature increases. Moreover, even when the turbine inlet temperature is any one of 1050° C., 1300° C., and 1450° C., a turbocharger designed for gasoline engines for automobiles can be used as the first and second turbochargers 10 and 24 without providing a cooling mechanism in each of the first and second turbochargers 10 and 24, and an extremely low-cost turbo cluster gas turbine system 2 can be realized. Moreover, when the turbine inlet temperature is 1050° C., it is not necessary to provide a cooling mechanism in each blade of the output turbine 6, and it is possible to realize a turbo cluster gas turbine system 2 at a lower cost.

Figure 5:
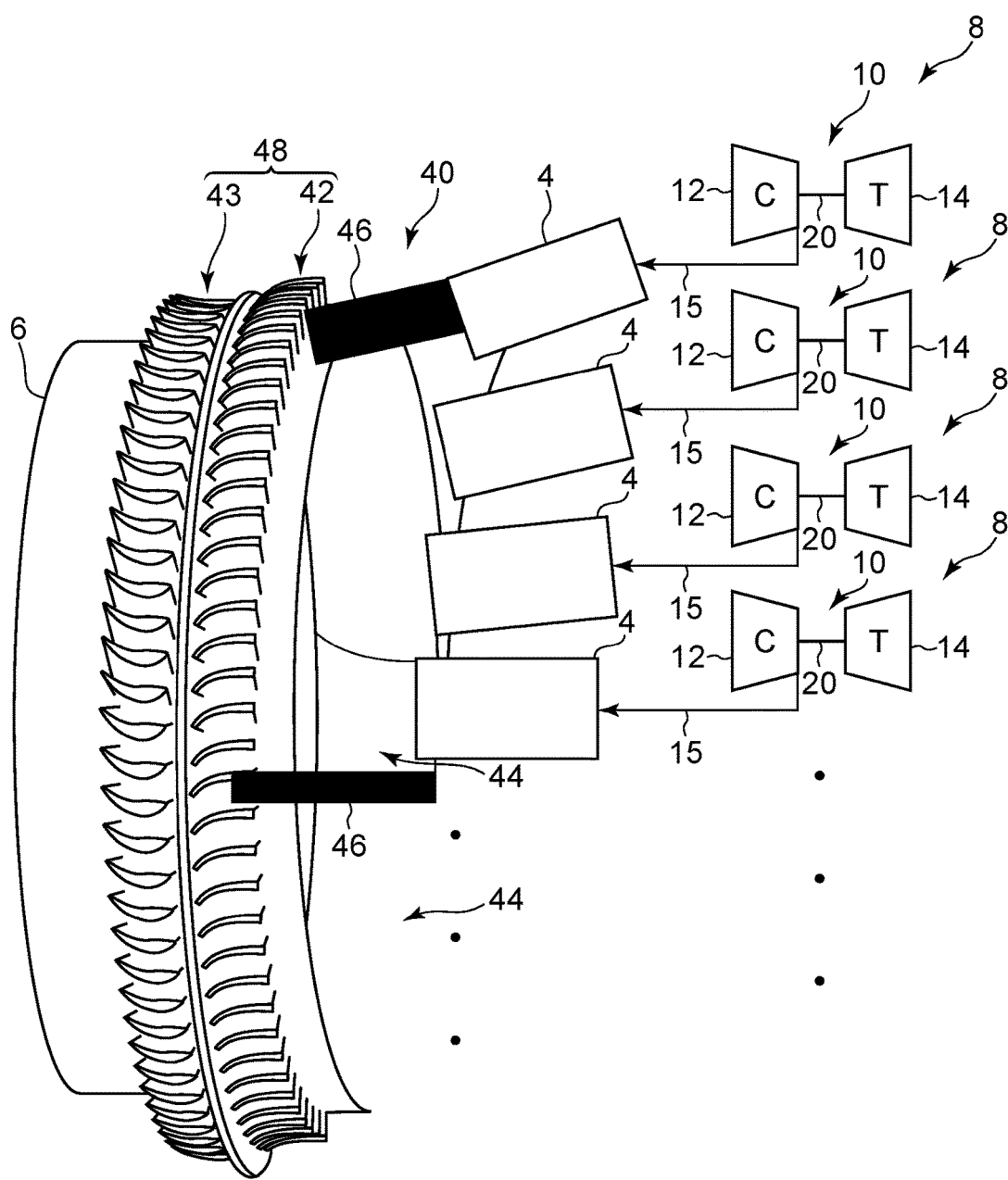
FIG. 5 is a schematic diagram illustrating an example of a correspondence between a combustor 4 of the turbo cluster gas turbine system 2 and a first turbocharger 10 of a supercharging system 8.
Figure 6:
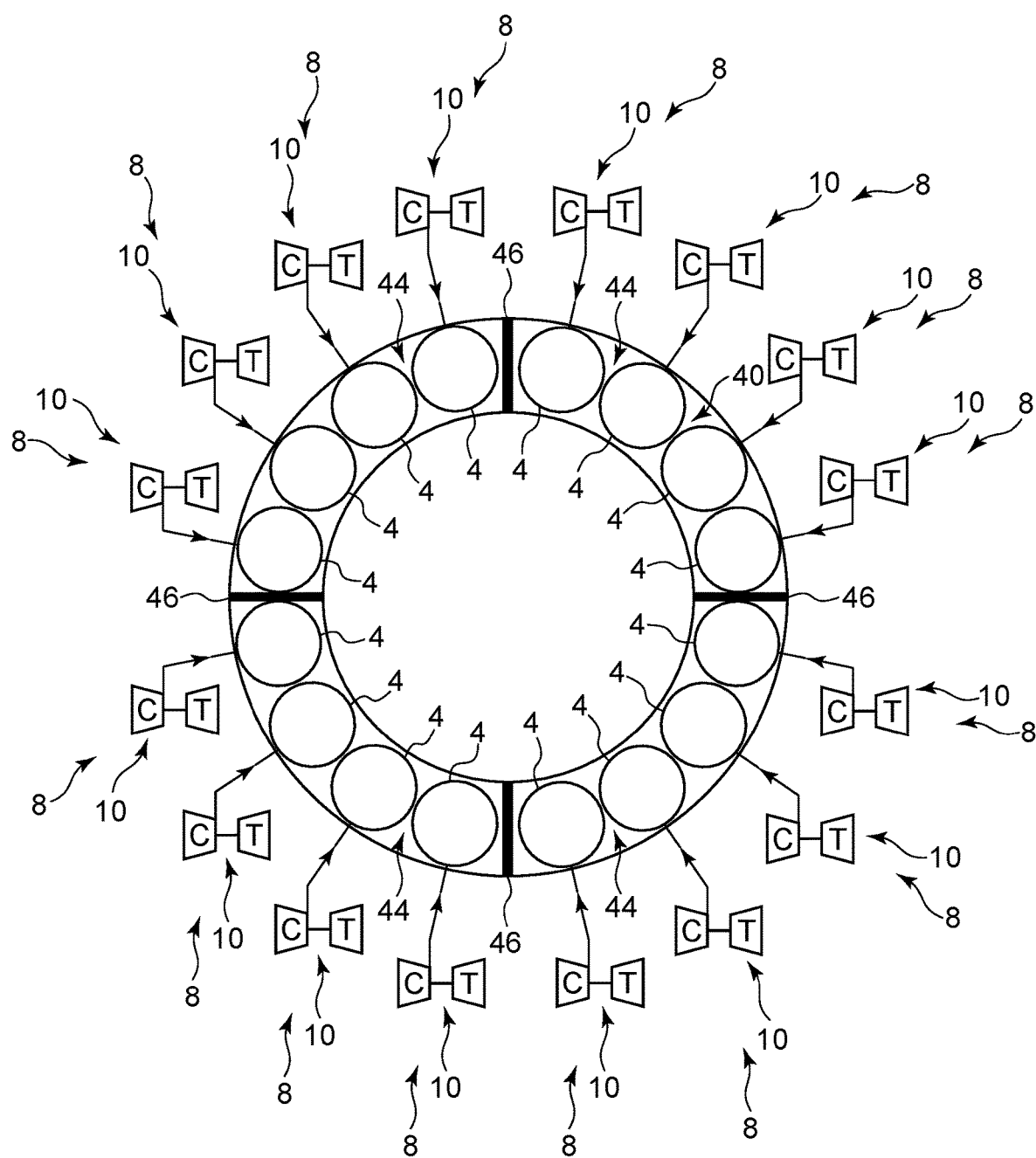
FIG. 6 is a schematic diagram illustrating the arrangement of the combustor 4 and the first turbocharger 10 of the supercharging system 8 in an axial view of the output turbine 6 in the configuration illustrated in FIG. 5.

FIG. 5 is a schematic diagram illustrating an example of a correspondence between the combustor 4 of the turbo cluster gas turbine system 2 and the first turbocharger 10 of the supercharging system 8. FIG. 6 is a schematic diagram illustrating the arrangement of the combustor 4 and the first turbocharger 10 of the supercharging system 8 in an axial view of the output turbine 6 in the configuration illustrated in FIG. 5.

In some embodiments, as illustrated in FIGS. 5 and 6, the plurality of supercharging systems 8 are configured to supply compressed air to the plurality of combustors 4, respectively. In an exemplary embodiment illustrated in FIGS. 5 and 6, the number of combustors 4 (the number of heat chambers) is 16 and the number of supercharging systems 8 (the number of first turbochargers 10) is 16, and the number of combustors 4 is the same as the number of supercharging systems 8. Therefore, compressed air is supplied from the compressor 12 of one first turbocharger 10 to one combustor 4 (one heat chamber) through the first air line 15.

In the embodiment illustrated in FIGS. 5 and 6, since the first air line 15 of each supercharging system 8 is connected to the corresponding combustor 4 without being joined to the first air line 15 of another supercharging system 8, it is possible to decrease pressure loss with the aid of smooth supercharging to realize high-efficiency combustion.

By adjusting the number of first turbochargers 10 to be driven among the plurality of first turbochargers 10, it is possible to realize flexible partial load operation. In the example illustrated in FIGS. 5 and 6, it is possible to obtain an output from 1/16 of the maximum load.

In some embodiments, as illustrated in FIGS. 5 and 6, the output turbine 6 has a plurality of partitioning portions 46 extending in a radial direction so that a casing 40 of the output turbine 6 is partitioned into a plurality of casing portions 44 in a circumferential direction between the combustor 4 and a single-stage stationary blade 42 of the output turbine 6. The combustion gas exhausted from the plurality of combustors 4 is supplied to the casing portions 44. In the illustrated exemplary embodiment, the output turbine 6 has four partitioning portions 46 that partition the casing 40 of the output turbine 6 into four casing portions 44 in the circumferential direction between the combustor 4 and the single-stage stationary blade 42 of the output turbine 6, and combustion gas is supplied from the four combustors 4 to the casing portions 44.

According to this configuration, by controlling driving and stopping of the plurality of first turbochargers 10 corresponding to the casing portions 44, it is possible to easily adjust the percentage (a partial insertion ratio) of the casing portions 44 to which combustion gas is to flow among the plurality of casing portions 44. In the illustrated exemplary embodiment, it is possible to easily change the partial insertion ratio to 25%, 50%, 75%, and 100% and obtain robust characteristics which provide high performance in all load ranges.

In some embodiments, in the configuration illustrated in FIG. 5, for example, the output turbine 6 includes a Rateau stage 48 having a single-stage stationary blade 42 and a single-stage rotor blade 43. Since a compressor is not connected to the rotation shaft 18 of the output turbine 6 of the turbo cluster gas turbine system 2, by using the high-performance Rateau stage 48 as a partially inserted turbine, it is possible to achieve two aims at once (that is, it is possible to realize high performance while decreasing a thrust load).

Figure 7:
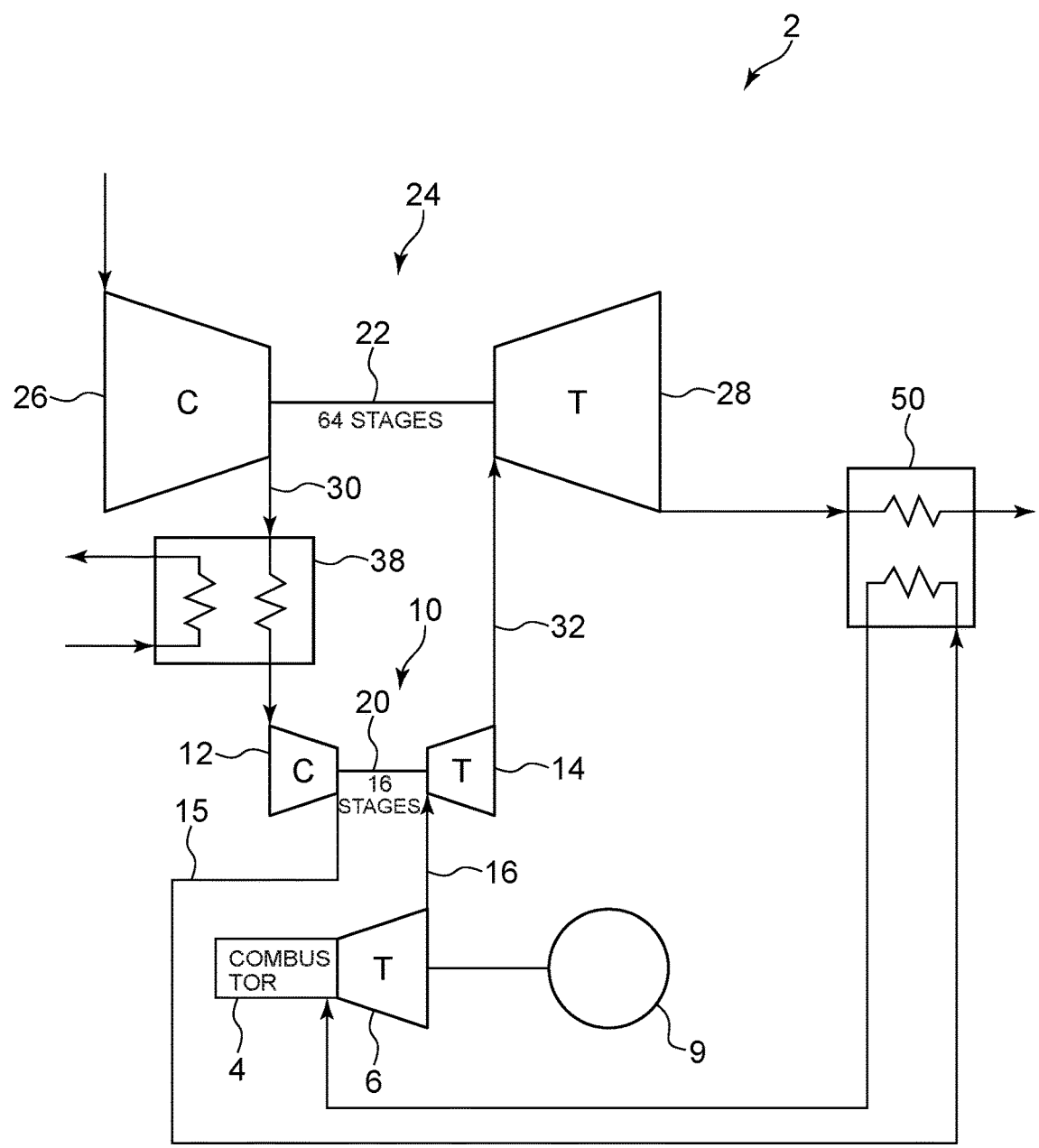
FIG. 7 is a schematic diagram illustrating a modification of the configuration illustrated in FIG. 3.

In some embodiments, as illustrated in FIG. 7, for example, the heat exchanger 50 is provided in the first air line 15. In the configuration illustrated in FIG. 7, the compressed air flowing through the first air line 15 exchanges heat with the combustion gas exhausted from the turbine 28 of the second turbocharger 24 in the heat exchanger 50 and is then supplied to the combustor 4 with the temperature being increased.

In this way, it is possible to collect heat energy of the combustion gas exhausted from the combustor 4 and to realize high efficiency of the turbo cluster gas turbine system 2.

Figure 8:
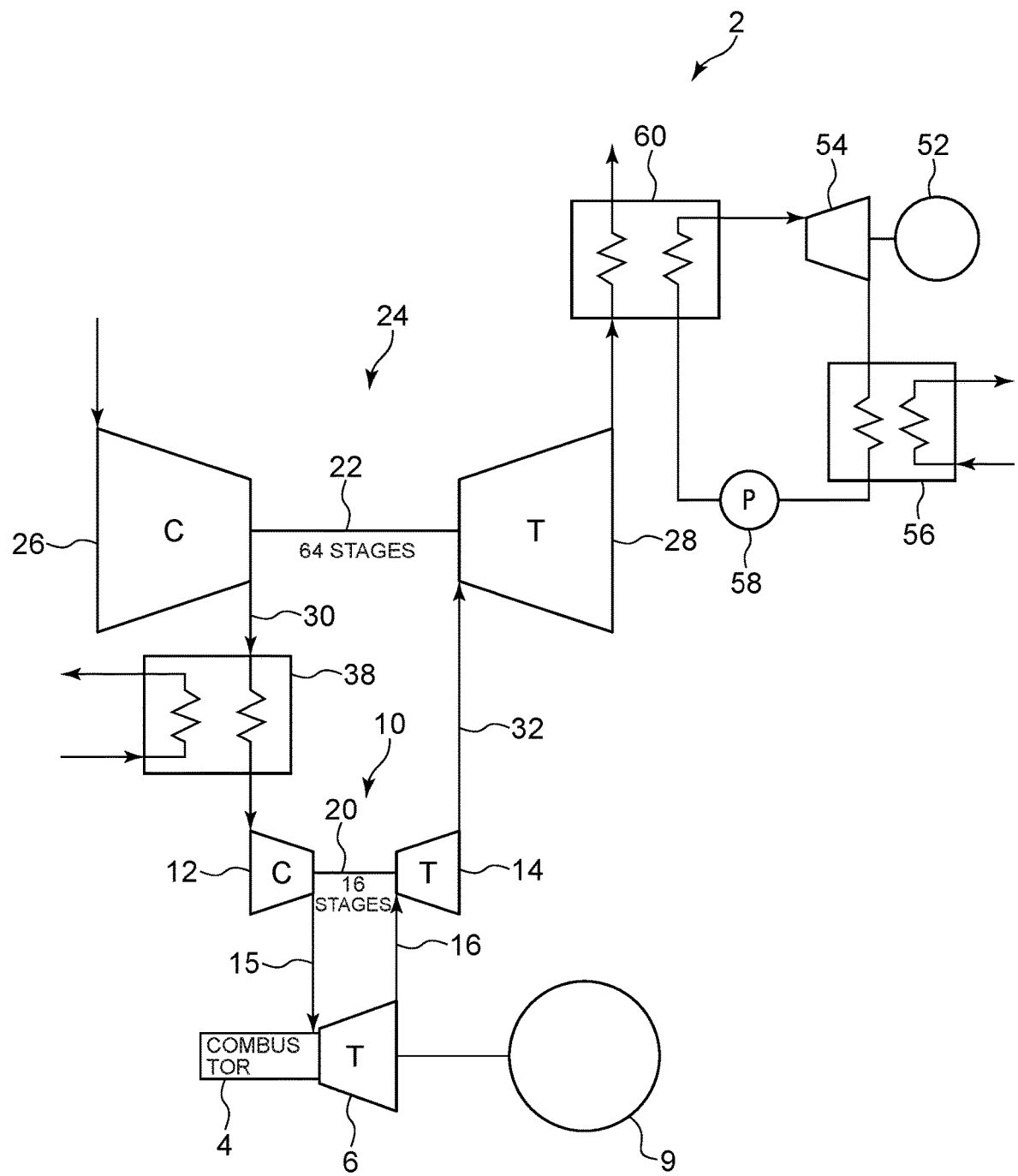
FIG. 8 is a schematic diagram illustrating a modification of the configuration illustrated in FIG. 3.

In some embodiments, for example, as illustrated in FIG. 8, the energy of the combustion gas exhausted from the turbine 28 of the second turbocharger 24 may be collected by a combination with the Rankine cycle. In the configuration illustrated in FIG. 8, the turbo cluster gas turbine system 2 includes a turbine 54, a condenser 56, a pump 58, and a heat exchanger 60 to which a generator 52 is connected. A heating medium supplied to the heat exchanger 60 by the pump 58 vaporizes with the temperature being increased by exchanging heat with the combustion gas exhausted from the turbine 28 of the second turbocharger 24 and drives the turbine 54.

In this way, the energy of the combustion gas exhausted from the turbine 28 can be collected by electric power obtained from the generator 52. For example, a steam turbine can be suitably used as the turbine 54 in auxiliary facilities of passenger ships, merchant ships, or power barges, and a supercritical $CO_2$ turbine in which a heat exchanger can be made in a compact size can be suitably used as the turbine 54 in warships in which a compact size is important.

In the turbo cluster gas turbine system 2, the piping route of the turbochargers 10 and 24 are divided, a heating medium can be inserted into the heat exchangers 38, 50, and 60 illustrated in FIG. 7 or 8, for example, from multiple directions, the degree of freedom in the layout around the heat exchangers 38, 50, and 60 can be improved, and the heat exchangers can be made in a compact size. Moreover, for example, when a mist separator, a heat exchanger, an exhaust facility, and the like are clustered to some extent and are provided to fit in each turbocharger 10 or 24 similarly to automobiles, the degree of freedom in layout is improved.

Figure 9:
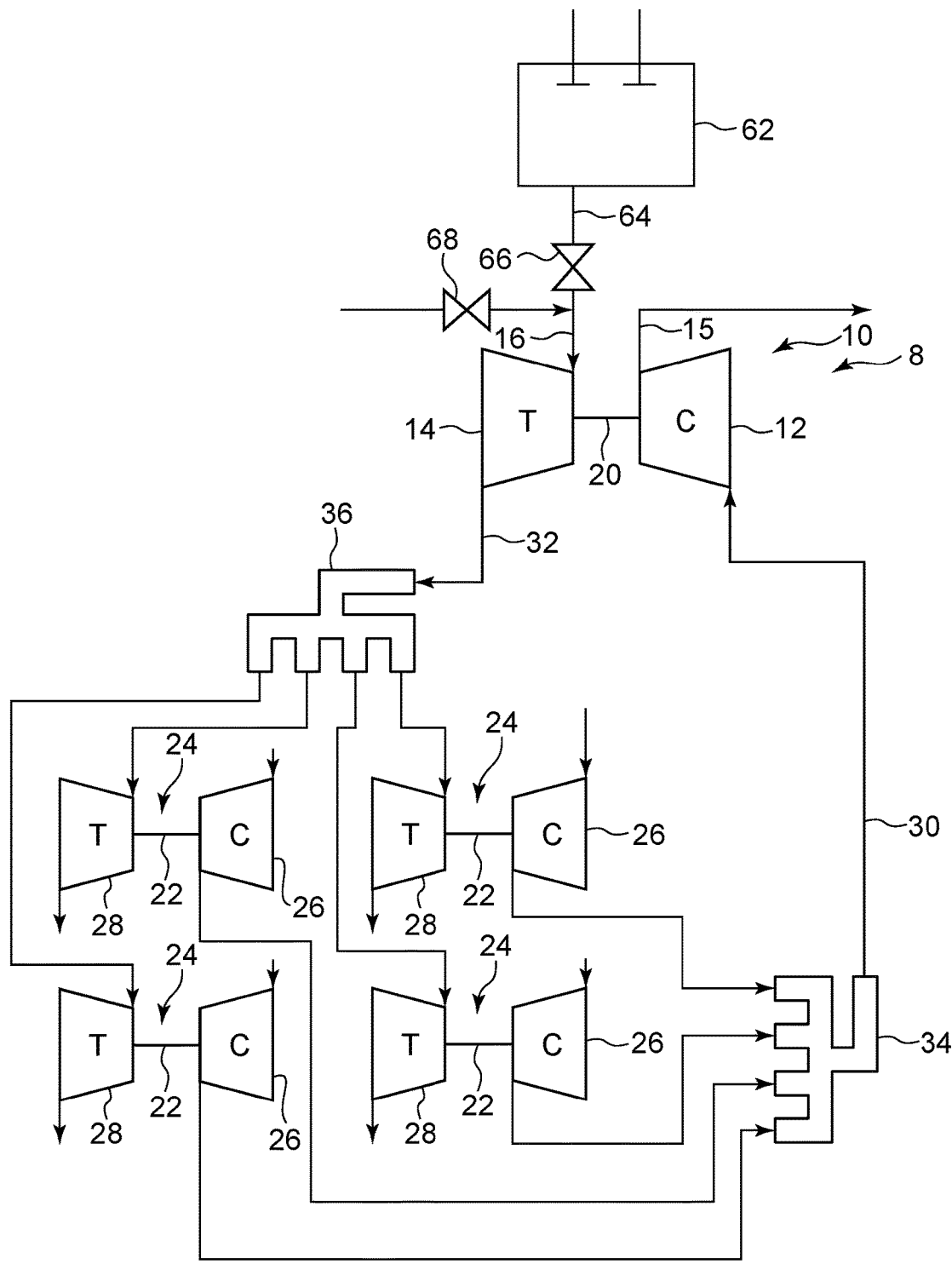
FIG. 9 is a diagram for describing an activation method of the output turbine 6.

In some embodiments, as illustrated in FIG. 9, for example, the turbo cluster gas turbine system 2 includes a reciprocating engine 62 as a starter for igniting the combustor 4. The reciprocating engine 62 is provided, for example, in only one or two of the plurality of supercharging systems 8. The reciprocating engine 62 is connected to the first combustion gas line 16 through the activation line 64, and a valve 66 is provided in the first combustion gas line 16, upstream of the connection position between the first combustion gas line 16 and the activation line 64, and a valve 68 is provided in the activation line 64.

When the system 2 is activated, the compressed air exhausted from the reciprocating engine 62 is supplied to the turbine 14 of the first turbocharger 10 through the activation line 64 and the first combustion gas line 16 to start rotation of the first turbocharger 10 in a state in which the valve 66 is closed and the valve 68 is open. The compressed air having passed through the turbine 14 of the first turbocharger 10 is supplied to the turbine 28 of the second turbocharger 24 and the second turbocharger 24 starts rotating. The air compressed by the compressor 26 of the second turbocharger 24 having started rotating is exhausted from the compressor 26, and is supplied to the compressor 12 of the first turbocharger 10, and is further compressed by the compressor 12. The compressed air exhausted from the compressor 12 is supplied to the combustor 4 (see FIG. 1) through the first air line 15, and the combustor 4 ignites the fuel using the supplied compressed air. Moreover, the combustion gas exhausted from the combustor 4 is supplied to the output turbine 6 (see FIG. 1) and the output turbine 6 starts rotating.

In this way, since quick ignition in the combustor 4 is realized with a simple configuration using the reciprocating engine 62, and the output turbine 6 is driven with the combustion gas generated by the combustor 4, it is possible to quickly activate the turbo cluster gas turbine system 2.

While the embodiment of the present invention has been described, the present invention is not limited to the above-described embodiments but includes modifications of the above-described embodiments and appropriate combinations of these modifications.

Figure 10:
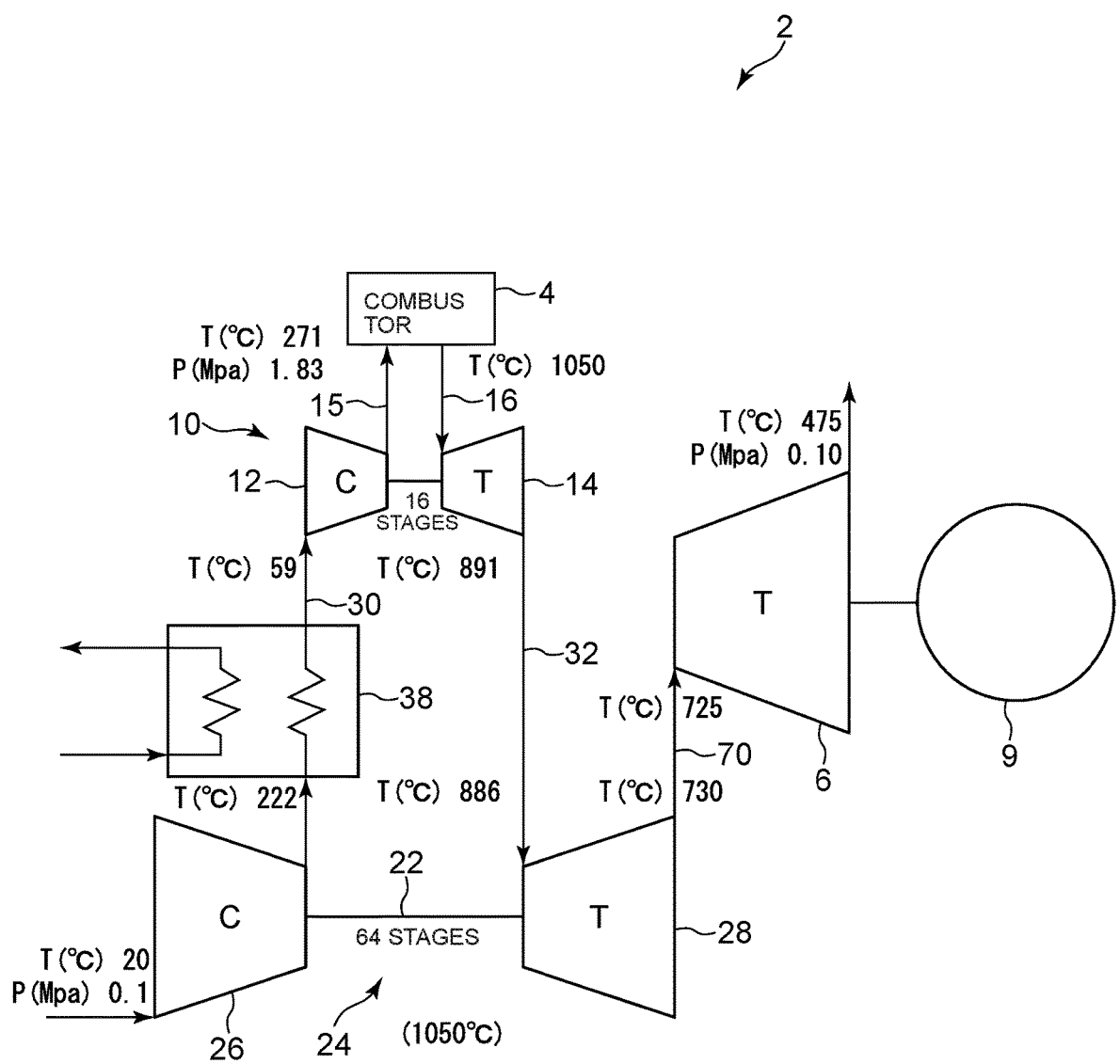
FIG. 10 is a schematic diagram illustrating a modification of the configuration illustrated in FIG. 3.

For example, in some embodiments described above, a configuration in which the output turbine 6 is provided in the first combustion gas line 16 has been illustrated. However, in another embodiment, the output turbine 6 may be provided on the downstream side of the turbine 28 of the second turbocharger 24. In the configuration illustrated in FIG. 10, each of the supercharging systems 8 includes a third combustion gas line 70 for supplying the combustion gas having passed through the turbine 28 of the second turbocharger 24 to the output turbine 6.

In this configuration, by adjusting the temperature of the combustion gas at the outlet of the combustor 4 to approximately 1050° C., from the perspective of heat resistance, a turbocharger designed for gasoline engines for automobiles in which nickel-base alloys or the like are used in materials of components can be used as the first and second turbochargers 10 and 24, and the cost reduction of the turbo cluster gas turbine system 2 can be realized.

In some embodiments described above, a configuration in which the output turbine is connected to the generator has been illustrated. However, the output turbine may be connected to a propeller for obtaining propulsion force of ships, for example. When a turbocharger designed for gasoline engines for automobiles is used as the first and second turbochargers, the output turbine can be suitably used for driving the propeller from the perspective of high responsiveness of the turbocharger designed for gasoline engines for automobiles.

In some embodiments described above, a turbo cluster gas turbine system including a plurality of combustors has been illustrated. However, the number of combustors included in the turbo cluster gas turbine system may be one. In this case, the compressed air generated by a plurality of supercharging systems is supplied to one combustor.

In some embodiments described above, a supercharging system including a plurality of second turbochargers has been illustrated. However, the number of second turbochargers included in the supercharging system may be one.

Moreover, in another embodiment, a plurality of turbo cluster gas turbine systems may be provided.

The invention claimed is:

1. A turbo cluster gas turbine system comprising:
   at least one combustor configured to combust a fuel to generate a combustion gas;
   an output turbine configured to be driven with the combustion gas from the at least one combustor; and
   a plurality of supercharging systems configured to supply compressed air to be supplied to the at least one combustor, wherein
   each of the supercharging systems includes:
      a first turbocharger having a rotation shaft formed separately from a rotation shaft of the output turbine and configured to be driven with the combustion gas from the at least one combustor;
      a first air line for supplying compressed air compressed by a compressor of the first turbocharger to the at least one combustor; and
      a first combustion gas line for supplying the combustion gas from the at least one combustor to a turbine of the first turbocharger,
   and wherein at least one of the plurality of supercharging systems includes:
      a reciprocating engine;
      an activation line connecting an outlet of the reciprocating engine and the first combustion gas line;
      a valve provided, in the first combustion gas line, upstream of a connection position between the first combustion gas line and the activation line; and
      a valve provided in the activation line.

2. The turbo cluster gas turbine system according to claim 1, wherein the output turbine is configured to supply the combustion gas from the at least one combustor to the turbine of the first turbocharger via the first combustion gas line, and
   a compressor is not driven by the rotation shaft of the output turbine.

3. The turbo cluster gas turbine system according to claim 2, wherein each of the supercharging systems includes:
   at least one second turbocharger having a rotation shaft formed separately from the rotation shaft of the output turbine and the rotation shaft of the first turbocharger;
   a second air line for supplying compressed air compressed by a compressor of the at least one second turbocharger to the compressor of the first turbocharger; and
   a second combustion gas line for supplying the combustion gas exhausted from the turbine of the first turbocharger to a turbine of the at least one second turbocharger.

4. The turbo cluster gas turbine system according to claim 3, wherein
   the turbo cluster gas turbine system includes a plurality of the combustors, and
   the plurality of supercharging systems are configured to supply compressed air to the plurality of combustors, respectively.

5. The turbo cluster gas turbine system according to claim 3, wherein
   each of the supercharging systems includes an intercooler provided in the second air line.

6. The turbo cluster gas turbine system according to claim 3, wherein
   a sum of the number of the first turbochargers and the number of the second turbochargers is 10 or more.

7. The turbo cluster gas turbine system according to claim 3, wherein at least one of the plurality of supercharging systems includes a heat exchanger for performing heat exchange between the compressed air flowing through the first air line and the combustion gas exhausted from the turbine of one of the at least one second turbocharger.

8. The turbo cluster gas turbine system according to claim 3, wherein at least one of the plurality of supercharging systems includes:
   a heat exchanger for performing heat exchange between a heating medium and the combustion gas exhausted from the turbine of one of the at least one second turbocharger; and
   a turbine configured to be driven with the heating medium exhausted from the heat exchanger.

9. The turbo cluster gas turbine system according to claim 2, wherein
   each first turbocharger is configured to meet heat resistance against the combustion gas.

10. The turbo cluster gas turbine system according to claim 2, wherein
    each first turbocharger is a turbocharger designed for an automobile gasoline engine.

11. A turbo duster gas turbine system activation method comprising:
    supplying compressed air exhausted from a reciprocating engine to a turbine of a first turbocharger of at least one of a plurality of supercharging systems to allow the first turbocharger to start rotating;
    supplying compressed aft exhausted from a compressor of the first turbocharger having started rotating to at least one combustor;
    igniting a fuel using the compressed air supplied to the at least one combustor; and supplying a combustion gas exhausted from the at least one combustor to an output turbine to allow the output turbine to start rotating;

wherein the turbo cluster gas turbine system comprises:

the at least one combustor configured to combust the fuel to generate the combustion gas;

the output turbine configured to be driven with the combustion has from the at least one combustor; and the plurality of supercharging systems configured to supply compressed air to be supplied to the at least one combustor wherein each of the supercharging systems includes:

the first turbocharger having a rotation shaft formed separately from a rotation shaft of the output turbine and configured to be driven with the combustion gas from the at least one combustor;

a first air line for supplying compressed air compressed by the compressor of the first turbocharger to the at least one combustor; and a first combustion gas line for supplying the combustion gas from the at least one combustor to the turbine of the first turbocharger, and wherein the at least one of the plurality of supercharging systems includes:

the reciprocating engine;

the activation line connecting an outlet of the reciprocating engine and the first combustion gas line;

a valve provided, in the first combination gas line, upstream of a connection position between the first combustion gas line and the activation line; and a valve provided in the activation line.

12. The turbo cluster gas turbine system activation method according to claim 11, further comprising:

supplying compressed air having passed through the turbine of the first turbocharger to a turbine of a second turbocharger to allow the second turbocharger to start rotating; and supplying compressed air exhausted from a compressor of the second turbocharger having starting rotating to the compressor of the first turbocharger.

\* \* \* \* \*